United States Patent Office 2,741,600
Patented Apr. 10, 1956

2,741,600

PROCESS OF PREPARING COLLOIDAL SILICA AQUASOLS

Lyman S. Allen, Gloucester, Mass., assignor to Monsanto Chemical Company, St. Louis, Mo., a corporation of Delaware No Drawing. Application January 27, 1949, Serial No. 73,215

11 Claims. (Cl. 252—313)

The present invention relates to processes for preparing stable silica aquasols containing large particles of colloidal silica.

It is one object of the present invention to prepare a stable, alkaline reacting silica aquasol from a thixotropic agglomerate of colloidal silica.

A further object of this invention is to provide an improved process for the preparation of a thixotropic agglomerate of colloidal silica suitable for use in the preparation of silica aquasols containing relatively large particles of colloidal silica.

Still further objects and advantages of this invention will appear from the following description and the appended claims.

The present invention is based on the discovery that a thixotropic agglomerate of colloidal silica, which is obtained from silica aquasols and/or silica aquagels in the manner hereinafter described, may be converted to a stable, silica aquasol by subjecting it to shear force, which may be supplemented by impact and centrifugal force, of sufficient intensity to disperse the thixotropic agglomerate. Some of the thixotropic agglomerates employed herein have sufficient fluidity by virtue of the water occluded or included therein to be dispersed directly to silica aquasols in the manner described. Other thixotropic agglomerates of colloidal silica, for example, those in solid or pasty solid form are preferably made up into a thick slurry or fluid paste by the addition of a sufficient amount of water or an alkaline reacting silica aquasol, before they are subjected to intense shear force. Illustrative of means suitable for imparting sufficient shear force to such an agglomerate to disperse it as a stable sol may be mentioned high speed colloid mills, Benet mills, Waring blenders and the like. Other means which utilize the principle of intense shear force may also be employed.

The thixotropic agglomerate of colloidal silica or mud, as it is sometimes hereinafter designated, is characterized by the fact that it is obtained in general as the result of a suitable heat treatment at elevated temperatures of silica aquasols, silica aquagels or mixtures thereof in the presence of an amount of free basic compound, that is, a compound containing ionizable hydroxyl groups or capable of forming hydroxyl ions in the presence of water, which is sufficient to cause solidification of the silica aquasol or conversion of a silica aquagel to a thixotropic mud. Such mud, when prepared in the proper manner, is generally obtained in the form of a solid mass, or as a plastic paste or even as a thick slurry. Even the solid form tends to change to a paste or to a thick slurry on standing for about 24 hours or more. The mud is thixotropic in the sense that it becomes liquid on shaking but reverts to its original form on standing. However, when it is subjected to intense shear force in a colloid mill, for example, it is recovered in the form of a stable silica aquasol which does not revert back to an agglomerate for long periods of time, for example, for periods of 4 to 16 months or longer.

Such mud or thixotropic agglomerate is distinguishable from coagulated silica aquasol or silica aquagels or similar forms of silica in that the latter forms of silica cannot be converted to stable silica aquasols by subjecting them to intense shear force in a high speed colloid mill or similar device. The resulting product in the latter instance is in the nature of a suspension and a substantial amount of silica particles therein soon settle out of the liquid phase.

It is believed that a thixotropic agglomerate of colloidal silica is made up of particles of colloidal silica which are in turn aggregates of even smaller particles of colloidal silica. Thus, there is evidence from electron microscope photographs that the ultimate particle of collodial silica measures about 10–20 m$\mu$ (millimicrons). These particles apparently aggregate to some extent since the prior art silica aquasols general contain average particles measuring between about 80 and 160 m$\mu$ as determined by Hauser's method wherein a supercentrifuging technique is employed. A thixotropic agglomerate of colloidal silica on the other hand is made up of average particles measuring 300 to 800 m$\mu$ indicating an even more advanced stage of agglomeration.

A preferred method or process for preparing a thixotropic agglomerate of colloidal silica or mud for use in the present invention comprises, in general, heating a silica aquasol in the presence of an amount of free basic compound sufficient to convert the silica aquasol to a solid or pasty solid. The heating is carried out under such conditions that loss of water from the aquasol by evaporation is substantially prevented. The temperature employed depends on the amount of free basic compound used, that is, lower temperatures may be used if larger amounts of free basic compound are present in the silica aquasol. When the silica aquasol is heated in a steam jacketed autoclave, a temperature in the steam jacket equivalent to a steam pressure of at least 145 pounds per square inch (gauge) has been found suitable in most instances. When operating in this manner, temperatures equivalent to steam pressures between about 165 to 200 pounds per square inch (gauge) are preferred. The duration of heating varies with the amount of free basic compound employed in the silica aquasol and the temperature used and may vary from 15 minutes to 3 or 4 hours. High temperatures and larger amounts of free basic compound give rapid conversion of the silica aquasol to mud or thixotropic agglomerate.

The quantity of free basic compound employed may be varied to a considerable extent depending upon the initial silica aquasol used, that is, the manner in which it is prepared. Thus, in some instances it may be necessary to add a free basic compound to the silica aquasol prior to heating and in other instances the silica aquasol, as prepared, may contain sufficient free basic compound to be converted directly by heating. In general, the alkalinity of such silica aquasols should be adjusted if necessary prior to heating by the addition of a suitable free basic compound until it contains at least 0.4% of free basic compound (calculated as sodium ion) based on the weight of silica aquasol. This may be determined, for example, by titrating a suitable portion of the sol with a standard acid solution. However, larger amounts of free basic compound may be present in the silica aquasol prior to heating, if desired.

As examples of free basic compounds which are added to the silica aquasol for the purpose described or which may be present in the silica aquasol after it is prepared may be mentioned alkali metal hydroxides such as NaOH, KOH and the like, ammonia, ammonium hydroxide, alalkali metal carbonates such as $Na_2CO_3$, $K_2CO_3$ and the like, quaternary ammonium hydroxides and alkali metal silicates such as sodium silicate, potassium silicate and the like and mixtures of such compounds. Of these, sodium hydroxide and/or sodium silicate are preferred since they are readily available and are most suitable for converting silica aquasols to thixotropic agglomerates of the type hereinbefore described.

The silica aquasols employed in the above described process may be prepared in a variety of ways. However, they should be alkaline reacting, as prepared, and should also be substantially free of salts or electrolytes. They may be prepared by the known processes of the prior art, for example, by first mixing an aqueous solution of an inorganic acid such as aqueous sulfuric acid and aqueous solution of an alkali metal silicate such as aqueous sodium silicate until an acid reacting mixture of suitable silica concentration is obtained, allowing the mixture to set to a gel, allowing the resulting gel to synerize, washing the gel substantially free of salts or electrolytes, covering the washed gel with weak caustic soda solution, draining the solution from the gel and then heating the resulting gel in an autoclave without appreciable loss of water until the gel is converted to a sol. Such method is described in greater detail in the patent to John F. White, No. 2,375,738, granted May 8, 1945.

Still another suitable silica aquasol for use in the above described process may be prepared by first mixing a dilute aqueous solution of an inorganic acid, such as sulfuric acid, and a dilute aqueous solution of alkali metal silicate, such as sodium silicate, in such proportions as to form an acid reacting mixture, precipitating salts or electrolytes from the mixture by the addition of a water miscible organic diluent such as ethyl alcohol, separating the precipitated salts from the liquid constituents of the mixture, admixing the resulting liquid and a sufficient amount of an aqueous solution containing a small amount of alkali compound to form an alkaline reacting mixture and then removing the organic diluent from the resulting mixture. The sol obtained in this manner may be concentrated if desired. Such method is described in greater detail in the copending application of Vincent DiMaio, Serial No. 776,853, now U. S. Patent No. 2,515,949, granted July 18, 1950.

A preferred silica aquasol for use in the above described process is one prepared by first passing a dilute solution of sodium silicate through a bed of insoluble ion exchange material such as zeolite, followed by a mild heat treatment, for example, at 100° C. in the presence of small amounts of free alkali. Such method is described in greater detail in the patent to Bird, No. 2,244,325, granted June 3, 1941.

Still other methods of preparing silica aquasols which may be used in the processes of the present invention will be apparent to those skilled in the art.

In converting silica aquasols of the type described to a solid or pasty solid mud or agglomerate of colloidal silica in accordance with the process hereinbefore described, it is generally desirable to employ silica aquasols containing between about 10 and 25% colloidal silica by weight. However, it is possible in some instances to use more dilute sols or sols containing higher concentrations of silica.

It has also presently been found that the mud or gelatinous precipitate obtained by the conversion of a silica aquagel to a silica aquasol by an autoclaving process is substantially the same as or is similar in behavior to the mud prepared by autoclaving silica aquasols in the manner hereinbefore described; and that such mud may be dispersed, except for any sand present therein, to a silica aquasol when subjected to the intense shear force of the type generated in a colloid mill, Benet mill, Waring blender or the like. Thus, when a silica aquasol is prepared by autoclaving at elevated temperatures a silica aquagel which has been previously covered with an alkali and there is an incomplete conversion of the silica aquagel to silica aquasol, a mud or gelatinous precipitate is obtained which may be dispersed to a silica aquasol in accordance with the principles of the present invention. Heretofore, this mud was thought to be entirely undesirable and was removed from the silica aquasol by centrifuging and then discarded.

In accordance with the present invention such mud may be separated from the silica aquasol and then redispersed as such in a colloid mill to form a silica aquasol, or it may be redispersed with water in a colloid mill or it may even be dispersed in the silica aquasol itself by using a high speed colloid mill. The latter procedure yields a silica aquasol containing colloidal silica particles of two entirely distinct average particle sizes, that is, average particles of silica measuring 100–180 m$\mu$, present in the silica aquasol as prepared by autoclaving silica aquagel, and average particles measuring 300 to 800 m$\mu$ obtained by dispersing the mud in a colloid mill. These average particle sizes were determined by a technique which involves supercentrifuging of the aquasol, and the procedure involved will be discussed in greater detail hereinafter.

It is possible then in accordance with this invention to prepare stable silica aquasols containing particles of colloidal silica of considerably larger average particle size than has been possible by any method known heretofore. And it is also possible to blend this silica aquasol with silica aquasols prepared by prior art methods to produce silica aquasols having two separate and distinct average particle sizes.

A further understanding of the present invention will be obtained from the following specific examples wherein parts and percentages are given by weight unless otherwise specified.

*Example I*

A silica aquasol was first prepared as follows:
One hundred and thirty-seven parts of 66° Bé. $H_2SO_4$ were diluted with 716 parts of water and charged to a mixing tank. A silicate solution was then prepared by diluting 944 parts of a sodium silicate solution analyzing 8.9% $Na_2O$ and 29% $SiO_2$ with 754 parts of water. The silicate solution was then added to the sulfuric acid solution with stirring. After the addition was completed, stirring was discontinued and the mixture soon set up as a gel. The gel was allowed to synerize for 16 hours and the syneresis liquor was then drained from the gel. The synerized gel was crushed into lumps of 1 inch cross section and the gel lumps were then washed with a continuous flow of water for 16 hours and were substantially free of electrolytes or salts. The washed gel was then covered with 1500 parts of water containing 1.8 parts of NaOH. After standing 6 hours, the excess solution was drained off and the gel was charged to an autoclave. The gel was heated for 3 hours, using steam at 200 pounds per square inch (gauge pressure) in the jacket of the autoclave. The contents of the autoclave were then blown out. The resulting aquasol analyzed about 12.5% $SiO_2$, 0.05% $Na_2SO_4$ and 0.075% NaOH, and had a pH of 9.2.

A thixotropic agglomerate of colloidal silica was prepared from the above silica aquasol as follows:
Two thousand parts of the above silica aquasol were adjusted by the addition of a 10% sodium silicate solution until they contained about 0.72% of free sodium ion based on the silica aquasol. The amount of free sodium ion present was determined by titrating a portion of the aquasol with standard acid solution to the neutral point and then calculating the quantity of sodium ion equivalent to the acid consumed. The pH of the silica aquasol was about 10.7 (glass electrode). The aquasol was then charged to an autoclave. The aquasol was heated for 30 minutes using steam at 160 pounds per square inch (gauge pressure) in the jacket of the autoclave. The autoclave pressure was then released and opened. A solid white product was obtained which changed to a pasty white solid on standing.

The resulting solid was charged to a Waring blender, a high speed mixer operating at 3600 R. P. M., with sufficient water to impart fluidity to the mass and then thoroughly agitated until the mass was completely dispersed. The resulting product was a chalky white fluid having good stability. The average particle size as determined by a supercentrifuging technique was about 450 m$\mu$. The average particle size of the original silica aquasol determined in the same manner was 100 to 180 m$\mu$.

*Example II*

A batch of pasty white solid consisting of a thixotropic agglomerate of colloidal silica was prepared in accordance with the procedure of Example I. This pasty white solid was mixed with sufficient silica aquasol to form a heavy slurry. The silica aquasol used was prepared in accordance with the procedure described in the first paragraph of Example I. The resulting slurry was charged to a high speed colloid mill and was recovered in the form of a silica aquasol having excellent stability and a white chalky appearance. This aquasol contained colloidal silica aggregates of two distinct sizes namely, average particles measuring 100 to 180 m$\mu$. and about 400 m$\mu$.

*Example III*

A silica aquagel was first prepared as described in the first paragraph of Example I. After the silica aquagel was synerized and crushed into lumps, it was then covered with 1500 parts of water containing 5.4 parts of NaOH. After standing for 8 hours, the excess solution was drained off and the gel was charged to an autoclave. The gel was heated for 3 hours, using steam at 200 pounds per square inch (gauge pressure) in the jacket of the autoclave. The contents of the autoclave were then discharged and allowed to stand for 24 hours. By this time the product had separated into two layers; one consisting of silica aquasol, the other consisting of mud in the form of a white pasty mass. The mud amounted to about 30% by volume of the entire product discharged from the autoclave. The silica aquasol was separated from the mud by decantation. The mud was then charged to a high speed colloid mill and recovered as a silica aquasol having a chalky white appearance. The average particle measured about 450 m$\mu$.

*Example IV*

A silica aquasol was first prepared as follows:

An aqueous sodium silicate (3.1 to 1 ratio of SiO$_2$ to Na$_2$O) containing 3% SiO$_2$ was allowed to flow through a 12 inch deep bed of small beads of polymerized divinyl benzene containing nuclear substituted sulfonic acid groups (as cation exchange material) which was contained in a cylindrical glass tube having an internal diameter of approximately 1⅞ inches. The rate of flow was about 300 parts of solution per minute. The silicate solution was allowed to flow through the bed until the total effluent contained about 0.07% sodium ion. The effluent was then concentrated by evaporation at 100° C. until it contained about 18% SiO$_2$. The resulting aquasol was transparent with a bluish cast.

The above silica aquasol was adjusted by the addition of 10% sodium silicate solution until it contained about 0.41% sodium ion based on the silica aquasol. At this sodium ion concentration the pH was about 10.6 (glass electrode). The sol was then charged to an autoclave and heated therein for 14 hours using steam at 160 pounds per square inch (gauge pressure) in the jacket of the autoclave. A solid white product was obtained which changed to a pasty white mass on standing for 24 hours. This pasty mass was then dispersed in a high speed colloid mill and recovered as an exceedingly stable silica aquasol which is stable for at least 12 months. The product is chalky white in appearance and contains average particles measuring about 350 m$\mu$.

The size of the particles of colloidal silica present in the silica aquasols of this invention was determined according to the general principles proposed by Hauser and Lynn, pages 141 to 149 of their treatise entitled "Experiments in Colloid Chemistry" (1940), published by McGraw-Hill Book Company Inc., New York, N. Y. The technique employed, the mathematical treatment of the method used and other considerations involved in the adaptation of supercentrifuges for the measurement of particle size of colloids are described in greater detail by Hauser et al., J. Phys. Chem. 40, 1169 (1936); Hauser et al., J. Phys. Chem. 44, 584 (1940); Hauser et al., J. Ind. & Eng. Chem. 32, 659 (1940); and Fancher et al., J. Ind. & Eng. Chem. Anal. Ed. 14, 552 (1942). In the literature references cited, Hauser and his co-workers describe the preparation of a particle size distribution curve from the particle size data obtained in accordance with their methods. Since the entire area under the particle size distribution curve represents the total weight of the particles in the colloidal system tested, the area under the curve which is included between any two different particle diameters represents the weight of particles within that particular particle diameter size range. It is possible by using such particle size distribution curve to select a particle diameter at which 50% of the area under the particle size distribution curve, that is 50% of the total weight of particles, includes particles of a smaller particle diameter and 50% of the area under the curve includes particles of a larger diameter. The particle diameter which meets this condition represents the average particle size of all the particles in the colloidal solution. It is in this sense or meaning that the terms "average particle" or "average particle size" are used in the description of the present invention.

The silica aquasols prepared in accordance with this invention may be used for a variety of purposes. Thus they may be used as finishing agents for coating or impregnating paper, textiles, leather and the like. They may also be used for impregnating or coating moulds used in precision casting. Other uses will be apparent to those skilled in the art to which they appertain.

It is to be understood that the details of the processes described herein may be varied or modified as will be apparent to those skilled in the art without departing from the spirit or letter of this invention, and it is intended that this invention be limited only by the scope of the appended claims.

What is claimed is:

1. A process of preparing stable silica aquasols containing dispersed colloidal silica particles which comprises subjecting a thixotropic agglomerate of colloidal silica and water to shear force of sufficient intensity to disperse said thixotropic agglomerate to a stable colloidal solution.

2. A process of preparing stable silica aquasols containing dispersed colloidal silica particles which comprises charging a thixotropic agglomerate of colloidal silica and water to a high speed colloid mill and recovering therefrom a stable colloidal solution.

3. A process of preparing stable silica aquasols containing dispersed colloidal silica particles which comprises heating a material selected from the group consisting of silica aquagels, silica aquasols and mixtures thereof at a temperature equivalent to a steam pressure of at least 145 pounds per square inch (gauge) in the presence of an amount of free basic compound sufficient to convert said material to a thixotropic agglomerate of colloidal silica until said material is converted to a thixotropic agglomerate of colloidal silica and water and then subjecting the resulting thixotropic agglomerate to a shear force of sufficient intensity to disperse it to a stable colloidal solution.

4. A process of preparing stable silica aquasols containing dispersed colloidal silica particles which comprises heating a silica aquasol at a temperature equivalent to a steam pressure of at least 145 pounds per square inch (gauge) in the presence of an amount of free basic compound sufficient to convert said silica aquasol to a thixotropic agglomerate of colloidal silica until said silica aquasol is converted to a thixotropic agglomerate of colloidal silica and water and then subjecting the resulting thixotropic agglomerate to a shear force sufficient to disperse it to a stable colloidal solution.

5. A process of preparing stable silica aquasols containing dispersed colloidal silica particles which comprises heating a silica aquasol to a temperature equivalent to steam pressures between about 165 to 200 pounds per square inch (gauge) in the presence of at least 0.4% by weight of free basic compound (calculated as sodium ion) based on the silica aquasol for a period of time sufficient to convert said silica aquasol to a thixotropic agglomerate of colloidal silica and water and then subjecting said thixotropic agglomerate to shear force sufficient to disperse it to a stable colloidal solution.

6. A process substantially according to claim 5 wherein the free basic compound employed is sodium hydroxide.

7. A process substantially according to claim 5 wherein the free basic compound employed is sodium silicate.

8. A process substantially according to claim 5 wherein the free basic compound is a mixture of sodium hydroxide and sodium silicate.

9. A process substantially according to claim 5 wherein the thixotropic agglomerate of colloidal silica and water is charged to a high speed colloid mill and is recovered as a stable colloidal solution.

10. A process of preparing stable silica aquasols containing average colloidal silica particles measuring 300 to 800 millimicrons which comprises heating a silica aquasol containing between about 10 and 25% by weight of colloidal silica at a temperature equivalent to a steam pressure of at least 145 pounds per square inch in the presence of at least 0.4% by weight of free basic compound (calculated as sodium ion) based on the silica aquasol for a period of time sufficient to convert substantially all of said silica aquasol to a thixotropic agglomerate of colloidal silica and water and then subjecting said thixotropic agglomerate to shear force of sufficient intensity to disperse said thixotropic agglomerate to a stable colloidal solution.

11. A process of preparing stable silica aquasols containing average colloidal silica particles measuring 300 to 800 millimicrons which comprises subjecting a thixotropic agglomerate consisting of water, a free basic compound and average colloidal silica particles measuring 300 to 800 millimicrons to shear force of sufficient intensity to disperse said thixotropic agglomerate to a stable silica aquasol.

References Cited in the file of this patent

UNITED STATES PATENTS

| | | |
|---|---|---|
| 2,044,757 | Cross | June 16, 1936 |
| 2,375,738 | White | May 18, 1945 |
| 2,386,337 | Moyer | Oct. 9, 1945 |
| 2,457,971 | Voorhees | Jan. 4, 1949 |
| 2,466,842 | Elston | Apr. 12, 1949 |
| 2,544,363 | Siemons | Mar. 6, 1951 |
| 2,572,578 | Trail | Oct. 23, 1951 |

OTHER REFERENCES

Outlines of Paint Technology, by N. Heaton, 3rd ed., 1947, Charles Griffin & Company, Limited, page 383.

The National Paint Dictionary, by J. R. Stewart, third edition, January 1948, published by the Stewart Research Laboratory, Washington, D. C., pages 569–570.